(No Model.)
Y. GRIMLAND & J. J. RINGNESS.
COTTON STALK BREAKING MACHINE.
No. 522,159. Patented June 26, 1894.
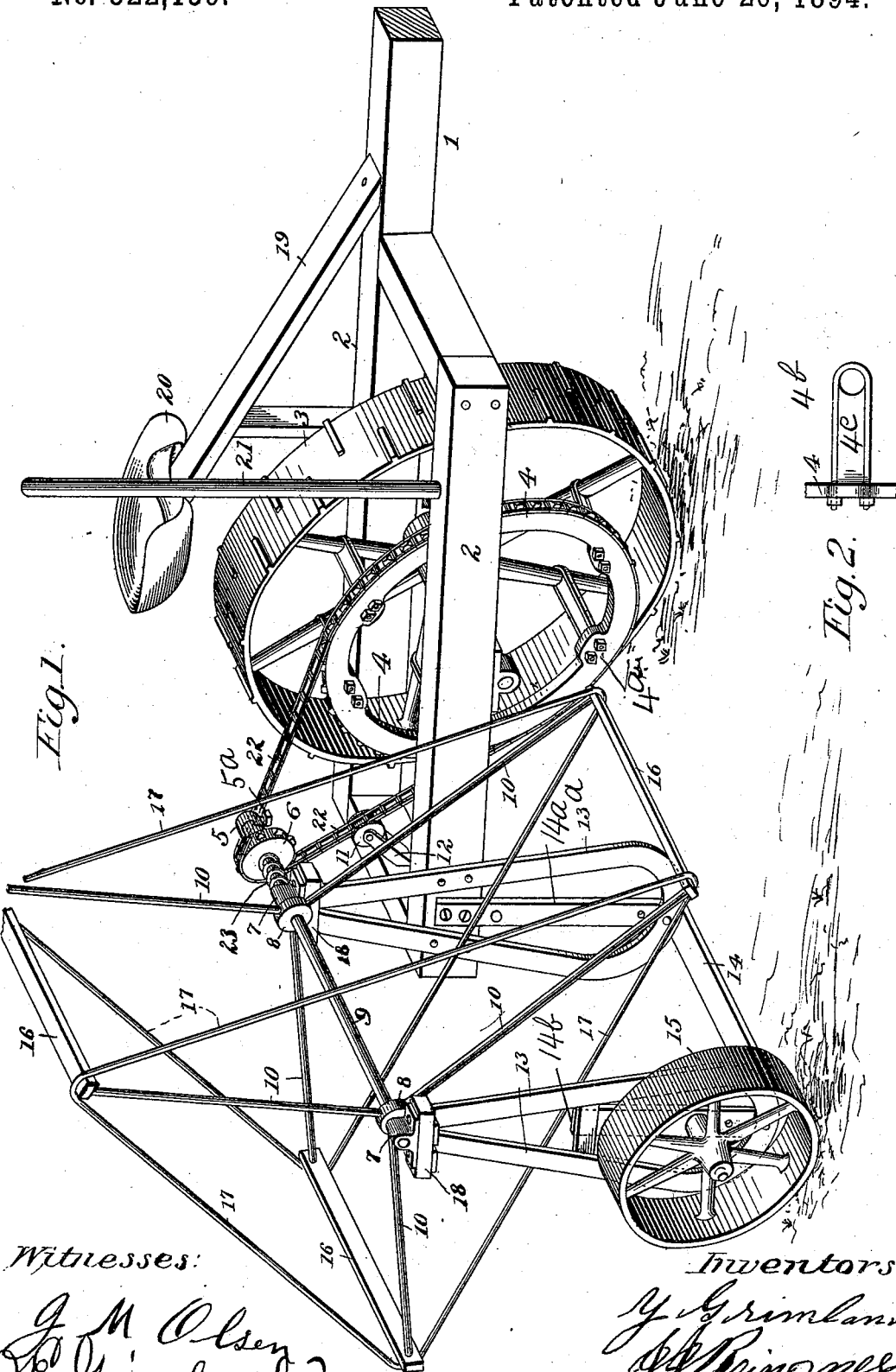
Witnesses:
J. M. Olsen
J. C. Grimland
Inventors:
Y. Grimland
J. J. Ringness

UNITED STATES PATENT OFFICE.

YEREN GRIMLAND AND JOHN J. RINGNESS, OF NORSE, TEXAS.

COTTON-STALK-BREAKING MACHINE.

SPECIFICATION forming part of Letters Patent No. 522,159, dated June 26, 1894.

Application filed February 26, 1894. Serial No. 501,612. (No model.)

*To all whom it may concern:*

Be it known that we, YEREN GRIMLAND and JOHN J. RINGNESS, citizens of the United States, residing at Norse, in the county of Bosque, State of Texas, have invented a new and useful Cotton-Stalk-Breaking Machine, of which the following is a specification.

Our invention relates to stalk breakers.

The object of our invention is to provide a simple and economically constructed stalk breaker, which shall admit of the team straddling the adjoining row, and the driving wheel to run in the furrow or stubble. The driver's seat to be mounted at one side, and out of range of the débris thrown from the reel.

It is also our object to provide a frame, and mechanism for stalk breakers adapted to be mounted on the running gear of a mower or reaper.

It is also our object to provide a novel break-reel for stalk breakers, which shall combine, with other advantages, strength, lightness, and durability, and adapted to be readily disconnected for convenience in storing, and shipping.

In the accompanying drawings, forming a part of this specification, Figure 1 is a perspective view of our stalk breaker, showing the frame, and mechanism. Fig. 2 is a detail view of the fastenings for the sprocket wheel.

Referring more particularly to the drawings:—1 denotes the tongue, 2 the main frame, 3 the driving wheel, 4 the sprocket wheel, 5 the ratchet clutch, 6 the reel sprocket, 7 7 the boxes or bearings for the reel sprocket, 8 8 the reel hubs, 9 the reel shaft, 10 the spokes or reel arms, 11 the idler, 12 a bracket or arm to support the idler, 13, 13, reel supports, 14 the stationary breaker bar, 15 a supporting caster-wheel, 16, 16, 16, the reel breaker-bars, 17 braces or ties for securing said breaker-bars, 18, 18, tie-blocks, 19 the seat support, 20 the seat, 21 the driver's guard, 22 the sprocket chain, and 23 a coiled spring mounted on the reel shaft.

The main frame is rectangular, and may be made of wood, or iron cast in one piece. The driving wheel is mounted in said frame, and has secured to its spokes the sprocket wheel 4. The means for attaching said sprocket wheel are shown in Fig. 2, and consist of a U shaped bolt $4^b$, having its ends screwthreaded, and a key $4^c$; said key has an arc shaped recess formed at one end, which fits or registers with the spoke, and concave depressions in its sides in which the sides of the U shaped bolt register. The sprocket wheel consists of a hoop of cast iron having teeth upon its outer periphery, and brackets $4^d$, having bolt holes therein through which the ends of the U shape bolts $4^d$ pass. To secure the sprocket wheel to the spokes, the U shape bolt is first passed around the spoke, the key $4^c$, is then fitted between the bolts the recessed end bearing against the spoke and the other end against the brackets, nuts are placed on the ends of the U shaped bolts projecting through the brackets and tightened until the sprocket is held rigidly to the spokes of the driving wheel. The sprocket chain connects the reel sprocket with the sprocket wheel and passes over an idler having flanges on each side between which the sprocket chain passes, and serves to guide and hold the same in gear; and give the proper tension, said idler is mounted in bearings on the bracket secured to the main frame. The reel sprocket is mounted loosely on the reel shaft and is provided with a clutch which engages with a sleeve-clutch 5, also mounted on said shaft; the clutch 5, is keyed to the reel shaft by a nut headed screw bolt $5^a$. The coiled spring is seated on the tie-block and bears against the inner side of the reel sprocket forcing it outwardly and engaging its clutch with the sleeve-clutch 5. The reel is proportioned as an equilateral triangle, the ends of the three breaker bars being secured in position at the angles by the spokes being secured to the inside, and the ties to the outside of each bar, thus bracing the reel at all points and giving great rigidity and strength to the same. The reel can be readily taken apart and packed in a small space for shipping, by first removing the ties 17, 17, and the breaker bars, and unscrewing the spokes from the hubs. The reel supports consist of two U shape pieces of iron, the sides approaching, near their upper ends, and said ends bent at right angles as shown in Fig. 1, to form supports, and perforated to admit bolts for securing the same to the tie blocks 18, 18. The piece 13ª is adjustably secured to the main frame by screwthreaded bolts and nuts, and its lower end is likewise secured to the bar 14, the piece 13 is secured at its lower end to the bar 14. The stationary breaker bar has its ends bent at right angles to form arms, the arm 14ª being adjustably secured to the main frame the arm 14ᵇ, being shorter, and having several perforations which serve as adjustable bearings for the caster wheel whereby the bar 14 may be raised or lowered. The purpose of the spring 23 is to keep the reel sprocket in gear with the clutch 5. It also serves in case of a sudden stoppage of the driving wheel to automatically throw the sprocket clutch out of gear and thereby prevent any breakage of the sprocket chain. When the screw bolt 5ª is loosened the reel sprocket and clutch 5 revolve on the reel shaft.

In moving the machine to or from the field the breaker bar may be elevated, and the reel turned to the position shown in the drawings thereby lifting its breaker bars from possible contact with any obstruction.

We claim—

1. In a machine for breaking stalks the combination with the running gear of a mower or reaper of the main frame the sprocket wheel, a reel having breaker bars operated by said sprocket wheel the reel supports, and the stationary breaker bar, substantially as shown and described.

2. In a stalk breaking machine, the combination of the main frame located to one side of the reel, the driving wheel mounted in said frame and adapted to run in the furrow or stubble to one side of said reel, the reel-supports and breaker bar adjustably mounted to one side of said frame and to the caster-wheel, substantially as shown and described for the purposes set forth.

Y. GRIMLAND.
J. J. RINGNESS.

Witnesses:
J. A. GRIMLAND,
M. C. LUND.